Patented Sept. 24, 1929

1,728,996

UNITED STATES PATENT OFFICE

KARL HOLZACH, OF LUDWIGSHAFEN-ON-THE-RHINE, GERMANY, ASSIGNOR TO GENERAL ANILINE WORKS, INC., OF NEW YORK, N. Y., A CORPORATION OF DELAWARE

MORDANT TRISAZO DYESTUFF

No Drawing. Application filed June 28, 1927, Serial No. 202,163, and in Germany July 5, 1926.

I have found that mordant trisazo dyestuffs of excellent fastness to light are obtained, by first coupling the diazo compound of amino salicylic acid or amino phthalic acid or a homologue or derivative of these substances with a primary aromatic amine, which couples in the para position, then further diazotizing the aminoazo dyestuff thus obtained and coupling with either the same or another primary amine, which couples in the para position and which must contain a sulfonic acid group, unless the amine already employed contains one, then again diazotizing and coupling with salicylic acid or one of its homologues or derivatives. The compounds thus obtained correspond to the general formula

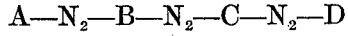

A—N$_2$—B—N$_2$—C—N$_2$—D in which A indicates the radical of salicylic or phthalic acid or a homologue or derivative of either of these, whilst B and C represent aromatic radicals, of which at least one must contain a sulfonic acid group and in which the azo groups are in the para positions, and D indicates a salicylic acid radical or one of its homologues or derivatives.

The trisazo compounds thus obtained are yellowish-brown to dark brown dyestuffs, the chromium compounds of which, whether produced as a separate substance or on the fibre, have similar shades and are very fast to boiling in water. Other metal compounds of these trisazo colors, such as for instance the copper compounds, possess the same properties.

The following example will further illustrate how my invention may be carried out in practice, but the invention is not limited to this example. The parts are by weight.

Example 153 parts of para-amino-salicylic acid are dissolved in 2000 parts of water, with the aid of 120 parts of sodium carbonate. After the addition of 69 parts of sodium nitrite thereto, the solution thus obtained is stirred into 400 parts of hydrochloric acid of 19° Bé. diluted with 1000 parts of water. After stirring for several hours, the diazo compound, which separates out, is filtered off and suspended in water, this mixture then being added to a neutralized solution of 223 parts of 1.6-naphthylamine-sulfonic acid, whereupon 200 parts of sodium acetate are added. The formation of the dyestuff is complete after stirring for several hours. The mixture is now made weakly alkaline by the addition of about 60 parts of sodium carbonate, and 69 parts of sodium nitrite are then added to the yellowish-brown solution. This mixture is allowed to flow into a mixture of 600 parts of hydrochloric acid of 19° Bé. and 600 parts of ice at 0° C. The diazotization is complete after stirring for about an hour. The diazo solution thus obtained is now run into a neutral solution of 223 parts of 1.7-naphthylamine-sulfonic acid, to which 200 parts of sodium acetate have been added. After stirring for several hours, the disazo dyestuff thus produced is precipitated by the addition of sodium chlorid and filtered off in the press. It is then dissolved in 10000 parts of water with the aid of 150 parts of sodium carbonate at about 50° C. The solution is cooled to 20° C. by the addition of ice and 69 parts of sodium nitrite are added thereto. The mixture is now allowed to flow into 500 parts of hydrochloric acid of 19° Bé., which is mixed with ice and water, and thus diazotized. After stirring for about two hours, the formation of the diazo compound is complete. This mixture is now stirred into a solution of 160 parts of ortho-cresotinic acid, and 400 parts of sodium carbonate in 2500 parts of water, which is maintained at from −3° to 0° C. with the aid of a freezing mixture. The reaction is complete after several hours of stirring. The dyestuff corresponding to the following formula:

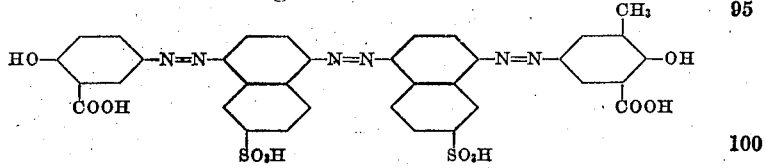

produced separates out on the addition of sodium chlorid, and consists of a blackish-brown powder, which dissolves in concentrated sulfuric acid with a pure blue color and dyes cotton brown shades with a reddish tinge. By a further treatment of this dyeing with chromium salts or by dyeing with the dyestuff on chromium mordants in the presence of chromium salts, dyeings are obtained, which are extremely fast to light, chlorine, boiling and soaping.

If the equivalent amount of meta-toluidine is employed in place of 1.7-naphthylamine-sulfonic acid, the shade of the dyestuff obtained is more yellowish-brown.

It is to be understood that my invention is not limited to the process described in the above example, but the new trisazo dyestuffs may be obtained in any suitable manner, for instance by varying the order in which the separate components are diazotized and coupled.

What I claim is:

1. A process for the production of mordant trisazo dyestuffs which comprises coupling the diazo compound of an aromatic carboxylic acid, containing in ortho position to the carboxylic group one of the groups —OH or —COOH, with a primary aromatic amine which couples in the para position, diazotizing the aminoazo compound thus obtained and again coupling with a primary amine which couples in the para position, at least one of said amines containing a sulfonic acid group, diazotizing the resulting compound and coupling with an aromatic carboxylic acid containing an —OH group in ortho position to the carboxylic group.

2. As new products, mordant trisazo dyestuffs of the general formula:

wherein A represents the radical of an aromatic carboxylic acid containing one of the groups —OH or —COOH in ortho position to the carboxylic group, B and C represent aromatic radicals, at least one of which is a naphthalene radical and at least one of which contains a sulfonic acid group, and in which the azo groups are in the para position, and D represents a radical of an aromatic carboxylic acid containing an —OH group in ortho position to the carboxylic group.

3. As new products, mordant trisazo dyestuffs of the general formula:

wherein A represents the radical of an aromatic carboxylic acid containing the group —COOH in ortho position to the carboxylic group, B and C represent aromatic radicals, at least one of which contains a sulfonic acid group and in which the azo groups are in the para position, and D represents a radical of an aromatic carboxylic acid containing an —OH group in ortho position to the carboxylic group.

4. As a new article of manufacture the trisazo dyestuff corresponding to the formula

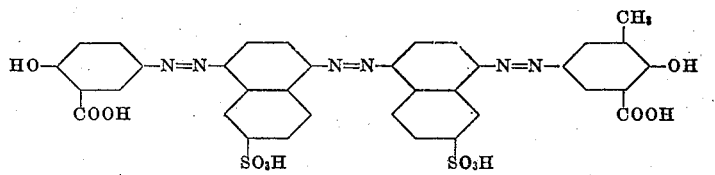

which dyestuff is a blackish-brown powder soluble in concentrated sulfuric acid with a pure blue color and dyes cotton brown shades with a reddish tinge.

In testimony whereof I have hereunto set my hand.

KARL HOLZACH.